United States Patent [19]

Peters

[11] Patent Number: 6,040,646

[45] Date of Patent: Mar. 21, 2000

[54] PLUG FOR CHANGING AN OPERATING CONDITION OF AN ELECTRIC MOTOR

[75] Inventor: Richard E. Peters, Tipp City, Ohio

[73] Assignee: A. O. Smith Corporation, Milwaukee, Wis.

[21] Appl. No.: 09/235,433

[22] Filed: Jan. 22, 1999

[51] Int. Cl.[7] .............................. H02K 11/00; H01R 27/00
[52] U.S. Cl. .......................... 310/71; 439/217; 439/218; 439/491; 310/68 A
[58] Field of Search ............................ 310/71, 89, 68 A; 439/217, 218, 222, 221, 224, 491

[56] References Cited

U.S. PATENT DOCUMENTS

| | | | |
|---|---|---|---|
| 2,543,131 | 2/1951 | Seifried | 318/245 |
| 2,619,621 | 11/1952 | Brown | 318/202 |
| 2,785,324 | 3/1957 | Manney et al. | 310/68 |
| 2,922,054 | 1/1960 | Miller | 310/71 |
| 3,139,492 | 6/1964 | Cage, Jr. | 200/11 |
| 3,210,578 | 10/1965 | Sherer | 310/71 |
| 3,231,767 | 1/1966 | Powell | 310/71 |
| 3,453,403 | 7/1969 | Hoffman | 200/51 |
| 3,541,265 | 11/1970 | Willits et al. | 310/71 |
| 3,585,471 | 6/1971 | Ecclesia | 318/225 |
| 3,602,748 | 8/1971 | Locke | 310/71 |
| 3,983,428 | 9/1976 | Bitsch et al. | 310/71 |
| 3,996,546 | 12/1976 | Hugly | 336/107 |
| 4,429,935 | 2/1984 | Lamb et al. | 339/32 M |
| 4,547,689 | 10/1985 | Tsuchimoto et al. | 310/71 |
| 4,585,964 | 4/1986 | Hildebrandt | 310/71 |
| 4,748,355 | 5/1988 | Anderson et al. | 310/71 |
| 4,781,610 | 11/1988 | Mercer | 310/68 C |
| 4,880,391 | 11/1989 | Hurtgen | 310/71 |
| 4,894,571 | 1/1990 | Hildebrandt et al. | 310/69 C |
| 5,017,818 | 5/1991 | Dohogne | 310/71 |

Primary Examiner—Nestor Ramirez
Assistant Examiner—Burton S. Mullins
Attorney, Agent, or Firm—Michael Best & Friedrich LLP

[57] ABSTRACT

Provided is a plug for changing an operating condition of an electric motor. The plug includes at least one electrical contact. A support structure includes at least one electrical contact. The plug is electrically connectable to the support structure in at least first and second positions in which at least one plug electrical contact engages at least one support structure electrical contact. The plug and the support structure engage each other independently of the electrical connection between the electrical contacts. The independent engagement means ensures that the plug may only be positioned in a predetermined number of suitable positions and may not be positioned in an unacceptable position which the plug would be positionable absent the independent engagement means. Indicating means are provided to further ensure that the proper electrical connection is made depending on the desired operating condition of the electric motor.

23 Claims, 3 Drawing Sheets

PLUG FOR CHANGING AN OPERATING CONDITION OF AN ELECTRIC MOTOR

FIELD OF THE INVENTION

The present invention relates, generally, to electric motors and, more particularly, to a plug for changing an operating condition, such as, the voltage, of an electric motor.

BACKGROUND OF THE INVENTION

Electric motors having variable operating conditions are well known in the art. Such an electric motor capable of operating on two differing voltages is disclosed in U.S. Pat. No. 3,983,428. The '428 patent discloses a three-terminal plug-in receptacle wherein push-fit connectors may be connected to either the left and center terminals, 120 volt operation, or to the center and right terminals, 240 volt operation. Moving the push-fit connector combination changes the circuit from a parallel configuration to a series configuration, thereby changing the voltage applied to the remainder of the circuit from 120 volts to 240 volts.

U.S. Pat. No. 3,231,767 discloses another electric motor having variable operating conditions. The '767 patent describes a circuit selection switch for changing operating conditions, such as, the operating voltage and the rotation, of a single-phase motor. The '767 patent describes a terminal board fixedly mounted within a motor frame and interconnected to incoming power leads and to motor windings. A removable plug is releasably coupled to the terminal board in any one of four positions each of which establishes a particular voltage and rotational circuit connection.

SUMMARY OF THE INVENTION

It is desirable to provide electric motors that are capable for use under many different operating conditions. In order to accommodate various operating conditions, it is desirable to provide a structure having electrical contacts designed to electrically connect with other electrical contacts of a plug. The structure and the plug include indicators which indicate the set operating condition of a motor. However, it may be desirable to limit the number of operating conditions that can be varied for any given motor. For example, it may be desirable to provide an electric motor whereby the only variable operating condition is the voltage rating. Nevertheless, for manufacturing reasons, such as production rates and costs, it is sometimes desirable to provide a structure and plug which include a number of electrical contacts so that they are capable for use in a motor with many variable operating conditions. Therefore, depending on the overall configuration of a motor, a plug may be positionable on a structure in any number of different positions, some of which are acceptable positions and some of which are unacceptable positions. The acceptable positions designate those positions which vary an operating condition of a motor and the unacceptable positions designate those positions where electrical contacts of a plug may connect to electrical contacts of a structure but, because of the configuration of the motor circuit, the motor is not properly functional.

One problem with the interchangeable connector means of the '428 patent is that there is no indication as to what combination of push-fit connectors and terminals provides a low or high voltage rating. Another problem with the apparatus described in the '428 patent is the possibility of connecting a push-fit connector to a wrong terminal or, stated differently, locating the push-fit connector in an unacceptable position. Meaning, if one or both of the push-fit connectors are placed in the wrong terminals, the current may not properly flow through the electric motor and the motor will not function as designed.

The circuit selection plug of the '767 patent is only positionable in one of four acceptable positions. There are no unacceptable positions. The motor described therein does not include extra electrical contacts in the terminal board and the plug which would allow additional positions in which the plug could be positioned on the terminal board to accommodate other operating conditions if it is desirable to provide such conditions. Thus, the motor described in the '767 patent is limited to changing voltage and rotational direction of the motor.

What is needed is a new plug for changing an operating condition in an electric motor, which plug is easy to use and eliminates the problems heretofore mentioned. What is further needed is a plug that eliminates confusion as to what operating condition an electric motor is set for. What is also needed is a plug that eliminates the possibility of incorrectly connecting electrical contacts in an electric motor which, if it does occur, prevents the electric motor from functioning properly. What is further needed is a plug designed to be positioned in a number of predetermined acceptable positions on a structure in an electric motor and which plug is not positionable in an unacceptable position on the structure in which the plug would be positionable except for the cooperation of the plug and the structure according to the present invention.

In one embodiment of the present invention, a support structure fixed relative to a motor housing includes at least one electrical contact. A plug which has at least one electrical contact engages the support structure electrical contact such that the plug is electrically connectable to the support structure in at least first and second positions in which at least one plug electrical contact engages at least one support structure electrical contact. The support structure and the plug engage each other independently of the electrical contacts such that the plug is positionable only in a number of predetermined acceptable positions, including the first and second positions, and such that the plug is not positionable in an unacceptable position in which one plug electrical contact would engage one support structure electrical contact and in which the plug would be positionable except for the engagement of the plug and the support structure independently of the electrical contacts.

In a preferred embodiment, a non-electrical projection is provided on either the support structure or the plug and a non-electrical recess is provided on the other of the support structure and the plug. In order for a particular operating condition to be chosen, the non-electrical projection mates with the non-electrical recess when the plug electrically engages the support structure.

Even more preferably, the plug includes two non-electrical projections having therebetween a non-electrical recess and the support structure has at least two spaced apart non-electrical projections. One of the non-electrical projections of the support structure mates with the non-electrical recess of the plug when the plug electrically engages the support structure such that a particular operating condition is set. The other non-electrical projection of the support structure mates with the non-electrical recess of the plug when the plug electrically engages the support structure such that another particular operating condition is set.

In another embodiment of the present invention, a terminal plug changes a voltage rating in an electric motor. A terminal board fixed relative to a motor housing includes at least one terminal board electrical contact. A terminal plug which has at least one terminal plug electrical contact engages at least one terminal board electrical contact such that the terminal plug is electrically connectable to the terminal board in at least first and second positions in which at least one terminal plug electrical contact engages one terminal board electrical contact. When the terminal plug is connected to the terminal board in the first position, a pair of windings electrically connectable to a power supply and contained within the motor are in parallel for creating a low-voltage power supply. When the terminal plug connects to the terminal board in the second position, the same windings are in series for creating a high voltage power supply. The terminal board and the terminal plug engage each other independently of the electrical contacts such that the terminal plug is positionable only in a number of predetermined acceptable positions, including the first and second positions. The terminal plug is not positionable in an unacceptable position in which one terminal plug electrical contact would engage one terminal board electrical contact and in which the terminal plug would be positionable except for the engagement of the terminal plug and the terminal board independently of the electrical contacts.

In yet another embodiment of the present invention, a terminal plug includes at least two terminal plug electrical contacts. A terminal board includes at least three terminal board electrical contacts. One of the terminal board electrical contacts is a common terminal board electrical contact for use in a low or a high-voltage capacity. For the low-voltage rating, the terminal plug, which houses the terminal plug electrical contacts, connects to the terminal board such that one terminal plug electrical contact connects to one of the terminal board electrical contacts, and a second terminal plug electrical contact connects to the common terminal board electrical contact. For the high-voltage rating, the terminal plug connects to the terminal board such that the first terminal plug electrical contact connects to the common terminal board electrical contact, and the other terminal plug electrical contact retained in the terminal plug does not connect to any terminal board electrical contact.

The terminal board electrical contacts for either low or high voltage are preferably in line with each other and preferably about 0.25 inches apart. Such a configuration allows for a quick change connect. If a low voltage rating is desired, the terminal plug is placed upon the appropriate terminal board electrical contacts as previously set forth. If a high voltage rating is desired, the terminal plug is simply lifted from the low voltage position and moved 0.25 inches to the side and re-engaged to the appropriate terminal board electrical contact as set forth above. Moving the terminal plug from the low voltage position to the high voltage position reconfigures the motor windings from a parallel (low voltage) configuration to a series (high voltage) configuration. A single movement of the terminal plug to an alternate position on the terminal board easily changes the motor voltage rating.

In a preferred embodiment, a non-electrical projection is provided on either the terminal board or the terminal plug and a non-electrical recess is provided on the other of the terminal board and the terminal plug. In order for a desired voltage to be chosen, the non-electrical projection mates with the non-electrical recess when the terminal plug electrically engages the terminal board.

Even more preferably, the terminal plug includes two non-electrical projections having therebetween a non-electrical recess and the terminal board has at least two spaced apart non-electrical projections. One of the non-electrical projections of the terminal board mates with the non-electrical recess of the terminal plug when the terminal plug electrically engages the terminal board such that a particular voltage rating is set. The other non-electrical projection of the terminal board mates with the non-electrical recess of the terminal plug when the terminal plug electrically engages that terminal board such that another particular voltage rating is set.

In any of the foregoing embodiments, the mentioned electrical contacts may be either male or female electrical contacts.

In any of the foregoing embodiments, the support structure, the terminal board, the plug, and the terminal plug may include indicators to show where the plug should be located with respect to the support structure and to show where the terminal plug should be located with respect to the terminal board, i.e., the appropriate electrical connection between the respective electrical contacts, for an operating condition of an electrical motor, e.g., a given voltage rating.

Accordingly, it is a feature of the present invention to provide an electric motor having the capability to operate on either of two power supply voltages, one of which may be substantially twice that of the other, by virtue of providing a voltage change device.

Another feature of the present invention is to provide a reliable voltage change device which virtually eliminates any confusion as to what combination of electrical contacts provides the necessary voltage rating.

A further feature of the present invention is to provide a voltage change device which is simple to make and inexpensive to manufacture while, at the same time, solving the problems noted above.

Yet another feature of the present invention is to provide a plug for changing an operating condition in an electric motor such that the plug may not be incorrectly positioned within a motor which, if allowed, would prevent the motor from operating in a correct manner.

Still another feature of the present invention is to provide a plug for changing an operating condition in an electric motor. Such an operating condition may include, for example, changing the rotation of an electric motor from clockwise to counter-clockwise. After review of the material herein, those skilled in the art will appreciate how the present invention is capable of changing any number of electric motor operating conditions, such operating conditions being generally known.

Other features and advantages of the invention will become apparent to those skilled in the art upon review of the following detailed description, claims and drawings.

Figure 1:
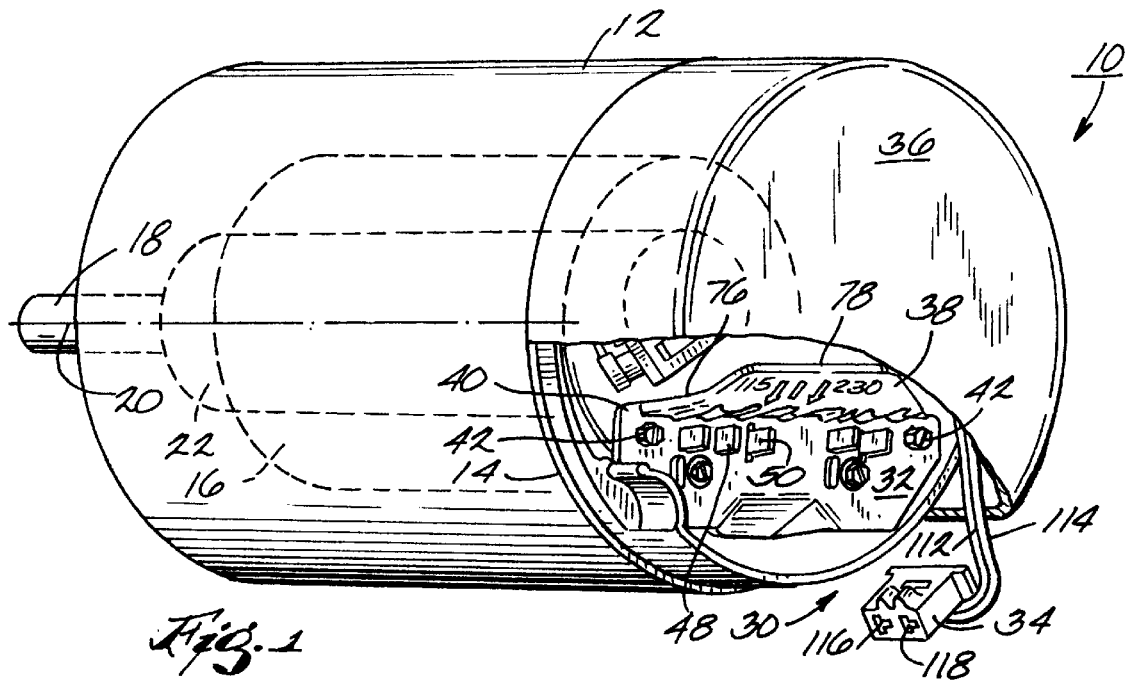
FIG. 1 is a perspective view, partially cut away, of a motor including a voltage change device according to the present invention.

Before the embodiments of the invention are explained in detail, it is to be understood that the invention is not limited in its application to the details of construction and the arrangements of components set forth in the following description or illustrated in the drawings. The invention is capable of other embodiments and of being practiced or of being carried out in various ways. Also, it is to be understood that the phraseology and terminology used herein is for the purpose of description and should not be regarded as limiting. The use of "including" and "comprising" and variations thereof herein is meant to encompass the items listed thereafter and equivalents thereof as well as additional items. The use of "consisting of" and variations thereof herein is meant to encompass only the items listed thereafter.

DETAILED DESCRIPTION OF THE PREFERRED EMBODIMENTS

Figure 7:
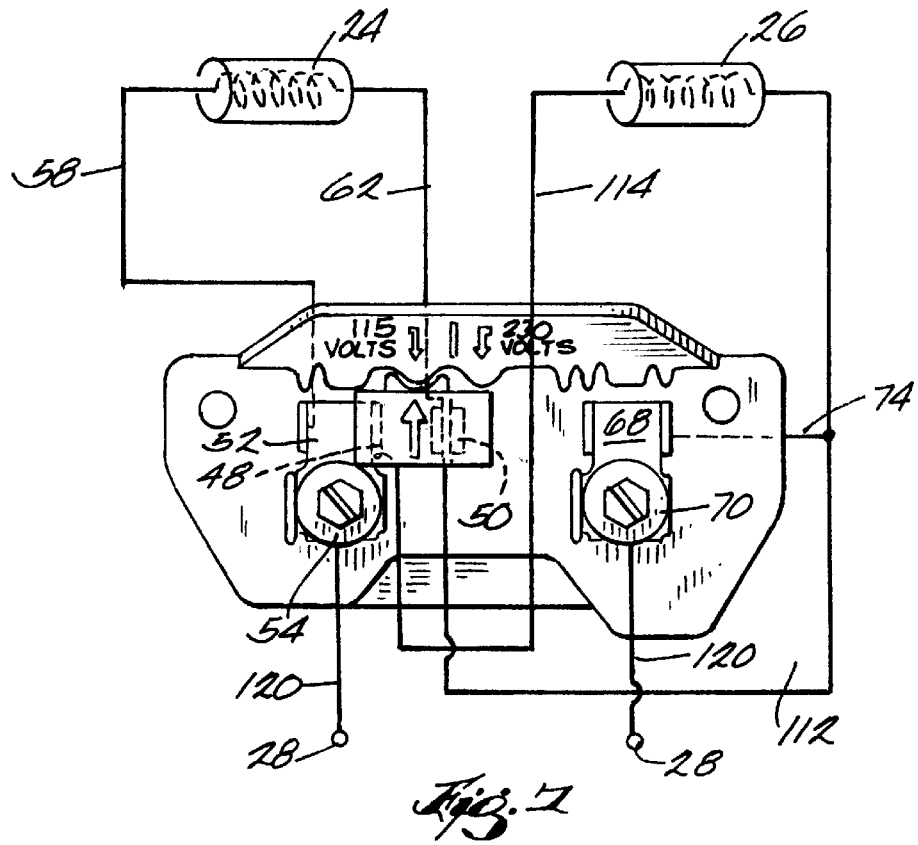
FIG. 7 is a diagrammatic view showing portions of a main field winding of the motor connected in parallel across a power supply.
Figure 8:
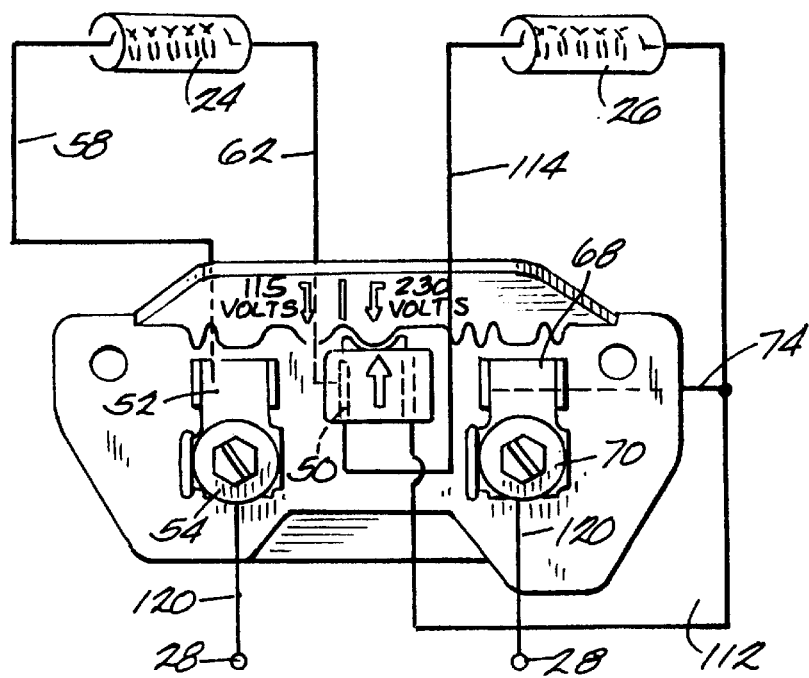
FIG. 8 is a diagrammatic view showing portions of the main field winding of the motor connected in series across the power supply.

Illustrated in FIG. 1 of the drawings is an electric motor 10, partially cut away. The electric motor 10 includes a housing 12 and an end frame 14 attached thereto. Stator 16 is fixed relative to the housing 12 or end frame 14 and a shaft 18 rotates about motor axis 20. Shaft 18 supports rotor 22 for rotation relative to the stator 16. Winding indicators 24 and 26 represent the main stator windings of the electric motor 10. As is commonly known in the art, the motor 10 is electrically connectable across a power supply (not shown) via electrical contacts 28 (FIGS. 7–8). FIG. 1 further shows an operating condition change device, such as a voltage change device 30, according to the present invention. The operating condition change device includes a support structure 32 and plug 34. The voltage change device 30 includes a terminal board 32 and a terminal plug 34. Cover 36 is positioned relative to end frame 14 to cover the voltage change device 30 and other typical components of an electrical motor not shown or described.

Figure 2:
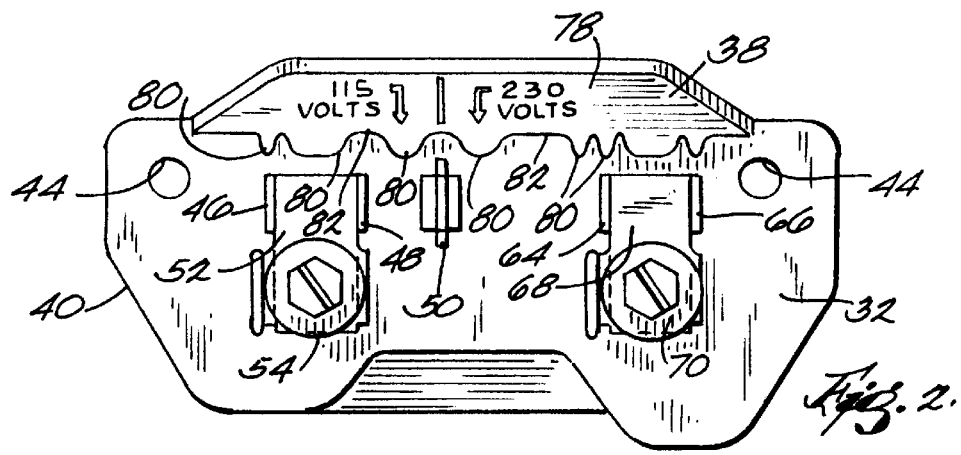
FIG. 2 is a top view of a terminal board assembly as shown in FIG. 1.
Figure 3:
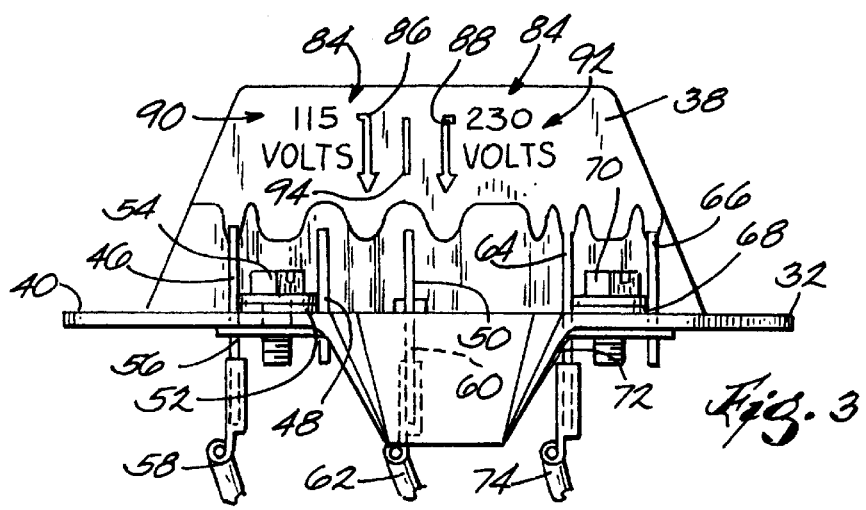
FIG. 3 is a front view of the terminal board assembly of FIG. 2.

Referring to FIGS. 1–3, the terminal board 32 includes a backing plate 38 and a base 40. The backing plate 38 is generally perpendicular to the base 40. The terminal board 32 can be made from any number of suitable materials known to those skilled in the art, but injection molded plastic is particularly well suited for use with the subject invention. The terminal board 32 is preferably fixed to end frame 14 by screws 42 extending through respective holes 44 found in base 40.

Still referring to FIGS. 1–3, base 40 of terminal board 32 includes, preferably in-line, terminal contacts 46, 48, and 50. Contacts 46 and 48 extend above base 40 from a common terminal bottom plate 52 which is conventionally secured to the base 40 by a screw 54. Contact portion 56 extends downward from the bottom plate 52 through base 40. Contact portion 56 is electrically connected to a lead wire 58 which is electrically connected to one end of the winding portion 24 (FIGS. 7–8). The terminal board contact 50 extends above and below base 40 such that contact portion 60 of contact 50 is below base 40. The contact portion 60 is electrically connected to a lead wire 62 which is electrically connected to the other end of winding portion 24 (FIGS. 7–8).

Still referring to FIGS. 1–3, also located on base 40 of terminal board 32 are, preferably in-line, terminal contacts 64 and 66, common bottom plate 68, screw 70, and contact portion 72, all of which are attached to terminal board 32 in the same manner as are the similar components just described. The contact portion 72 is electrically connected to a lead wire 74 which is electrically connected to one end of winding portion 26 (FIGS. 7–8).

It should be noted that not every contact 46, 48, 50, 64 and 66 is necessary in order to accomplish the appropriate electrical circuits described herein. However, for manufacturing purposes as set forth in the Summary section herein, these contacts are provided.

With reference to FIGS. 1–3, backing plate 38 has a bottom section 76 and a top section 78. The bottom section 76 of backing plate 38 extends generally perpendicular to the base 40. The top section 78 extends upward at an angle from the bottom section 76 and away from terminal board 32. To further explain, looking at the backing plate 38 from the side (see FIG. 1), the backing plate 38 has somewhat of a boomerang shape to it.

Referring still to FIGS. 1–3, a plurality of ribs or projections 80 extend from bottom section 76 of backing plate 38 of terminal board 32 towards contacts 46, 48, 50, 64 and 66. Ribs 80 are located between backing plate 38 and contacts 46, 48, 50, 64 and 66. Located between each pair of ribs of the plurality of ribs 80 are respective recesses 82. The significance of ribs 80 and recesses 82 will be further explained below in conjunction with the description of FIGS. 5–8.

With continued reference to FIGS. 1–3, the terminal board 32 includes an indicator 84. The indicator 84 includes arrows 86 and 88, markings or instructions for 115 volts 90, markings or instructions for 230 volts 92, and a dividing line 94. Dividing line 94 is positioned on backing plate 38 directly above terminal board contact 50. Arrow 86 and the low voltage instructions 90 are located on one side of dividing line 94 and the other arrow 88 and high voltage instructions 92 are located on the other side of dividing line 94. The function of the indicator 84 will be further explained below in conjunction with the description of FIGS. 5–8.

Figure 4:
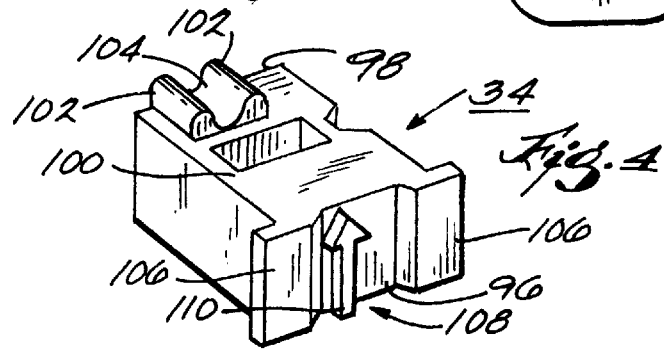
FIG. 4 is a perspective view of a terminal plug as shown in FIG. 1.

Referring to FIGS. 1 and 4, terminal plug 34 may be made from various materials known to those skilled in the art, but injected molded plastic works well with the principles of the present invention. Terminal plug 34 is generally mostly rectangular in shape but may be of any suitable shape according to the present invention. Terminal plug 34 includes a top surface 96, a bottom surface 98, and a side 100. Protruding from side 100 are ribs or projections 102. Preferably, ribs 102 are positioned substantially adjacent bottom surface 98. The overall length of ribs 102 may be greater or smaller than that shown. Between ribs 102 is a recess 104. The significance of ribs 102 and recess 104 will be further explained with reference to the description of FIGS. 5–8. Top surface 96 includes lips 106 which extend outward and generally perpendicular from respective sides of the plug 34. Lips 106 are used to maneuver terminal plug 34 with respect to terminal board 32 as will be more apparent below. The top surface 96 has thereon an indicator 108. The indicator 108 includes an arrow 110 pointing toward the side 100 of plug 34. The function of the indicator 108 will be further explained below in conjunction with the description of FIGS. 5–8.

With reference to FIG. 1, lead wires 112 and 114 connect to terminal plug female electrical contacts 116 and 118, respectively, which are housed within terminal plug 34. Lead wire 112 is electrically connected to one end of winding portion 26 (FIG. 7) and lead wire 114 is electrically connected to the other end of winding portion 26 (FIG. 7). It should be noted that in the illustrative embodiment, the plug is injected molded around portions of the wires and the contacts. In another embodiment, a plastic plug is provided and the top of the plug is left open. In this type of plug, the contacts attached to the lead wires are slid within openings of the plug and the top of the plug is filled in with an acrylic glue or other suitable material. Yet in another embodiment, contacts attached to lead wires are snap fitted into the proper locations found within a plug. The manner of locating the contacts in a terminal plug may be performed in any number of ways consistent with the present invention.

FIGS. 5–8 show the relationship between the terminal plug 34 and the terminal board 32 for a low voltage (FIGS. 5 and 7) and a high voltage (FIGS. 6 and 8) motor rating. One of the features of the present invention is to provide an electric motor having the capability to operate on either of two power supply voltages, one of which may be substantially twice that of the other, by virtue of providing a voltage change device as described herein.

Figure 5:
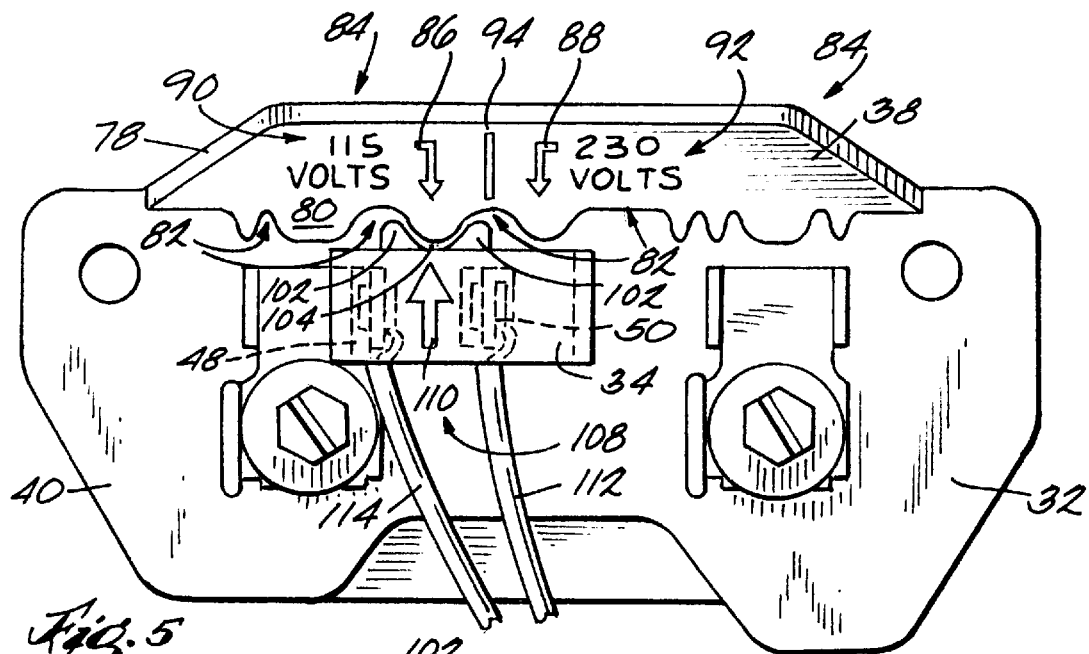
FIG. 5 is a top view showing the terminal plug connected to the appropriate terminal receptacles for a low voltage rating.

With reference to FIGS. 5 and 7, when it is desirable to connect the winding portions 24 and 26 in parallel across the power supply, the terminal plug 34 electrically connects to the terminal board 32 in the following manner. The terminal plug 34 is positioned on the terminal board 32 such that one electrical contact 118 (FIG. 1) housed within plug 34 and attached to lead wire 114 electrically connects to terminal board electrical contact 48, and the other electrical contact 116 (FIG. 1) housed within plug 34 and attached to lead wire 112 electrically connects to terminal board electrical contact 50. In this first position, recess 104 of plug 34 receives a rib 80 of terminal board 32. Also, in this first position, the terminal board indicator 84 and the terminal plug indicator 108 are aligned. Specifically, the arrow 110 on the terminal plug 34 points to the arrow 86 associated with the low voltage instructions 90 of the terminal board 32 to indicate that the motor is set for a low voltage, or 115 volt, power supply.

Figure 6:
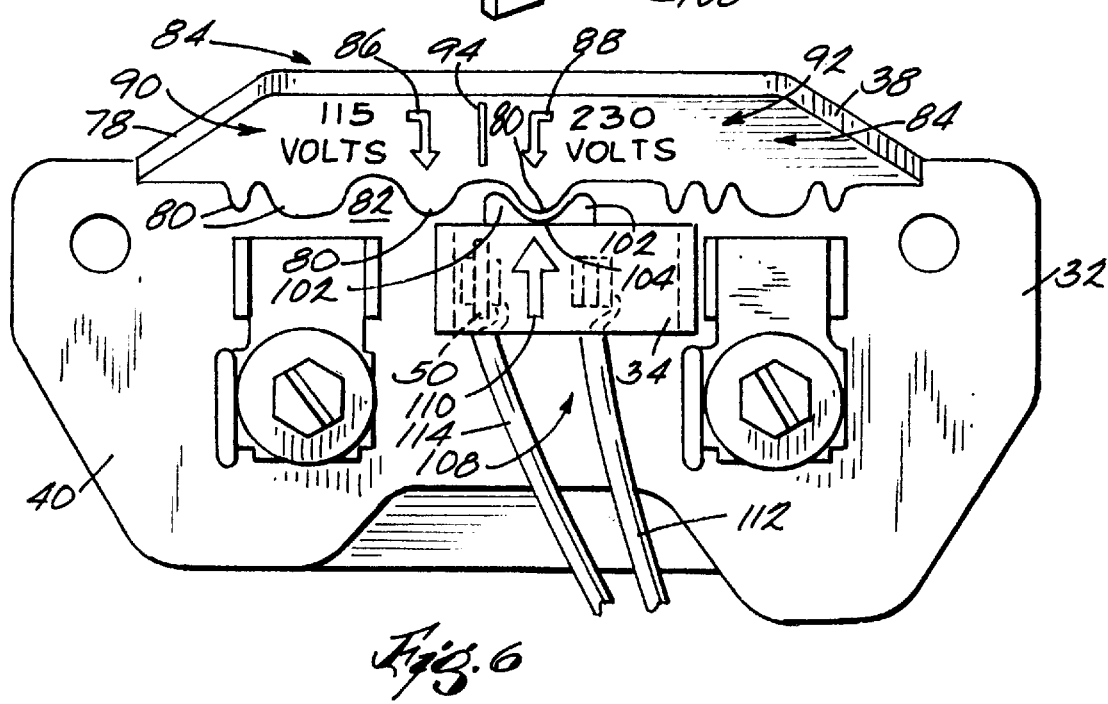
FIG. 6 is a top view showing the terminal plug connected to the appropriate terminal receptacle for a high voltage rating.

With reference to FIGS. 6 and 8, when it is desirable to connect the winding portions 24 and 26 in series across the power supply, the terminal plug 34 electrically connects to the terminal board 32 in the following manner. The terminal plug 34 connects to the terminal board 32 such that one electrical contact 118 (FIG. 1) housed within plug 34 and attached to lead wire 114 electrically connects to terminal board electrical contact 50, and the other electrical contact 116 (FIG. 1) housed within plug 34 and attached to lead wire 112 remains housed by plug 34 but does not electrically connect to any terminal board electrical contact. In this second position, recess 104 of plug 34 receives a rib 80 of terminal board 32. Also, in this second position, the terminal board indicator 84 and the terminal plug indicator 108 are aligned. Specifically, the arrow 88 associated with the high voltage instructions 92 of the terminal board 32 points to the arrow 110 on the terminal plug 34 to indicate that the motor is set for a high voltage, or 230 volt, power supply.

The terminal board 32 and the terminal plug 34 engage each other in two independent ways. First, certain terminal board electrical contacts electrically connect to certain terminal plug electrical contacts depending on the desired voltage rating, as set forth above. Second, the ribs and recesses of the terminal board and the ribs and recesses of the terminal plug mate in certain ways, also depending on the desired voltage rating. Although the terminal board and terminal plug have been described with reference to particular physical structure, the terminal board and terminal plug can include various male or female contacts or connectors according to the principles of the present invention. What is desirable is that the terminal board and the terminal plug engage each other independently of the respective electrical contacts such that the terminal plug is positionable only in a number of predetermined acceptable positions which include the positions previously described and associated with either a low or high voltage rating. Also, what is desirable is that the terminal plug is not positionable in an unacceptable position in which one of the terminal plug electrical contacts would engage one of the terminal board electrical contacts and in which the terminal plug would be positionable, except for the engagement of the ribs and recesses. For example, terminal board electrical contacts 64 and 66 are provided for manufacturing and other reasons but not to provide an acceptable position for a plug so that an operating condition of the motor can be changed. Electrical contacts 116 and 118 cannot connect to contacts 64 and 66 because the projections 80 on the terminal board 32 do not mesh with recess 104 of plug 34 if an attempt is made to place plug 34 on terminal board 32 in this position. It should be apparent that, but for the independent engagement of the terminal board 32 and the terminal plug 34 by the noted ribs and recesses, electrical contacts 116 and/or 118 would be positionable on contacts 64 and 66, which would represent an unacceptable position because the motor 10 is not designed to operate with such a connection.

The foregoing description of the present invention has been presented for purposes of illustration and description. Furthermore, the description is not intended to limit the invention to the form disclosed herein. For example, the voltage change device could be replaced with other support structures and plugs for changing any number of operating conditions of an electric motor according to the principles of the present invention as set forth in the Summary of the Invention herein. Consequently, variations and modifications commensurate with the above teachings, in skill or knowledge of the relevant art, are within the scope of the present invention. The embodiments described herein are further intended to explain the best modes known for practicing the invention and to enable others skilled in the art to utilize the invention as such, or other embodiments and with various modifications required by the particular applications or uses of the present invention. It is intended that the appended claims are to be construed to include alternative embodiments to the extent permitted by the prior art.

Various features of the invention are set forth in the following claims.

What is claimed:

1. An electric motor having an axis, said electric motor comprising:

a housing;

a stator fixed relative to said housing;

a shaft rotatable about the axis;

a rotor supported by said shaft for rotation therewith relative to said stator;

a support structure which is fixed relative to said housing and which has at least one electrical contact;

a plug which has at least one electrical contact engageable with said support structure electrical contact such that said plug is electrically connectable to said support structure in at least first and second positions in which at least one plug electrical contact engages at least one support structure electrical contact, said support structure and said plug engaging each other independently of said electrical contacts such that said plug is positionable only in a number of predetermined acceptable positions, including said first and second positions, and such that said plug is not positionable in an unacceptable position in which one plug electrical contact would engage one support structure electrical contact and in which said plug would be positionable except for said engagement of said plug and said support structure independently of said electrical contacts; and wherein one of said support structure and said plug includes two projections, and wherein the other of said support structure and said plug includes a recess, such that when said plug is electrically connected to said support structure in said first position, one of said projections mates with said recess, and such that when said plug is electrically connected to said support structure in said second position, said other of said projections mates with said recess.

2. An electric motor according to claim 1, wherein said electrical contacts are either male or female electrical contacts.

3. An electric motor according to claim 1, wherein said support structure and said plug include respective indicators such that in said first position and said second position said indicators align themselves to each other.

4. An electric motor according to claim 3, wherein said support structure indicator includes two arrows positioned on said support structure and said plug indicator includes one arrow positioned on said plug such that in said first position and said second position, said arrow on said plug points to one of said two arrows on said support structure.

5. An electric motor according to claim 4, wherein said support structure indicator further includes a set of markings, said markings being located on said support structure such that in said first position, said indicators indicate that the motor is set for one operating condition and, in said second position, said indicators indicate the motor is set for another operating condition.

6. An electric motor according to claim 1, wherein if an attrmpt is made to place said plug in an unacceptable position, one of said projections engages the other of said support structure and said plug so as to prvent said plug from being positioned in the unacceptable position.

7. An electric motor having an axis, said electric motor comprising:

an end frame;

a stator fixed relative to said end frame;

a shaft rotatable about the axis;

a rotor supported by said shaft for rotation therewith relative to said stator;

a pair of windings electrically connectable to a power supply;

a terminal board which is fixed relative to said end frame and which has at least one terminal board electrical contact;

a terminal plug which has at least one terminal plug electrical contact engageable with at least one terminal board electrical contact such that said terminal plug is electrically connectable to said terminal board in at least first and second positions in which at least one terminal plug electrical contact engages one terminal board electrical contact, such that when said terminal plug is connected to said terminal board in said first position, said windings are in parallel for creating a low voltage power supply and, such that when said terminal plug is connected to said terminal board in said second position, said windings are in series for creating a high voltage power supply, said terminal board and said terminal plug engaging each other independently of said electrical contacts such that said terminal plug is positionable only in a number of predetermined acceptable positions including said first and second positions, and such that said terminal plug is not positionable in an unacceptable position in which one terminal plug electrical contact would engage one terminal board electrical contact and in which said terminal plug would be positionable except for said engagement of said terminal plug and said terminal board independently of said electrical contacts; and wherein one of said terminal board and said terminal plug includes two projections, and wherein the other of said terminal board and said terminal plug includes a recess, such that when said terminal plug is electrically connected to said terminal board in said first position, one of said projections mates with said recess, and such that when said terminal plug is electrically connected to said terminal board in said second position, said other of said projections mates with said recess.

8. An electric motor according to claim 7, wherein said electrical contacts are either male or female electrical contacts.

9. An electric motor according to claim 7, wherein said terminal plug includes at least two terminal plug electrical contacts, and wherein said terminal board includes at least three terminal board electrical contacts, wherein one of said terminal board electrical contacts is a common terminal board electrical contact, such that when said terminal plug is connected to said terminal board in said first position, a first terminal plug electrical contact of said at least two terminal plug electrical contacts is electrically connected to one of said terminal board electrical contacts and a second terminal plug electrical contact of said at least two terminal plug electrical contacts is electrically connected to said common terminal board electrical contact, and such that when said terminal plug is connected to said terminal board in said second position, said first terminal plug electrical contact is electrically connected to said common terminal board electrical contact.

10. An electric motor according to claim 7, wherein if an attempt is made to place said terminal plug in an unacceptable position, one of said projections engages the other of said terminal board and said terminal plug so as to prevent said terminal plug from being positioned in the unacceptable position.

11. An electric motor according to claim 7, wherein said terminal board and said terminal plug include respective indicators such that in said first position and said second position said indicators align themselves to each other.

12. An electric motor according to claim 11, wherein said terminal board indicator includes two arrows positioned on said terminal board and said terminal plug indicator includes one arrow positioned on said terminal plug such that in said first position and said second position, said arrow on said terminal plug points to one of said two arrows on said terminal board.

13. An electric motor according to claim 12 wherein said terminal board indicator further includes low voltage markings and high voltage markings, said markings being located on said terminal board such that in said first position, said indicators indicate that the motor is set for the low voltage power supply and, in said second position, said indicators indicate the motor is set for the high voltage power supply.

14. An electric motor having an axis, said electric motor comprising:
- an end frame;
- a stator fixed relative to said end frame;
- a shaft rotatable about the axis;
- a rotor supported by said shaft or rotation therewith relative to said stator;
- a pair of windings electrically connectable to a power supply;
- a terminal board which is fixed relative to said end frame and which has at least one terminal board electrical contact;
- a terminal plug which has at least one terminal plug electrical contact engageable with at least one terminal board electrical contact such that said terminal plug is electrically connectable to said terminal board in at least first and second positions in which at least one terminal plug electrical contact engages one terminal board electrical contact; such that when said terminal plug is connected to said terminal board in said first position, said windings are in parallel for creating a low voltage power supply and, such that when said terminal plug is connected to said terminal board in said second position, said windings are in series for creating a high voltage power supply, said terminal board and said terminal plug engaging each other independently of said electrical contacts such that said terminal plug is positionable only in a number of predetermined acceptable positions including said first and second positions, and such that said terminal plug is not positionable in an unacceptable position in which one terminal plug electrical contact would engage one terminal board electrical contact and in which said terminal plug would be positionable except for said engagement of said terminal plug and said terminal board independently of said electrical contacts; and
- wherein said terminal plug includes at least two terminal plug electrical contacts, and wherein said terminal board includes at least three terminal board electrical contacts, wherein one of said terminal board electrical contacts is a common terminal board electrical contact, such that when said terminal plug is connected to said terminal board in said first position, a first terminal plug electrical of said at least two terminal plug electrical contacts is electrically connected to one of said terminal board electrical contacts and a second terminal plug electrical contact of said at least two terminal plug electrical contacts is electrically connected to said common terminal board electrical contact, and such that when said terminal plug is connected to said terminal board in said second position, said first terminal plug electrical contact is electrically connected to said common terminal board electrical contact.

15. An electric motor according to claim 14, wherein said electrical contacts are either male or female electrical contacts.

16. An electric motor according to claim 14, wherein at least one projection is on one of said terminal board and said terminal plug, and wherein at least one recess is on the other of said terminal board and said terminal plug, such that when at least one terminal plug electrical contact engages at least one terminal board electrical contact, at least one projection mates with at least one recess.

17. An electric motor according to claim 14, wherein one of said terminal board and said terminal plug includes two projections, and wherein the other of said terminal board and said terminal plug includes a recess, such that when said terminal plug is electrically connected to said terminal board in said first position, one of said projections mates with said recess, and such that when said terminal plug is electrically connected to said terminal board in said second position, said other of said projections mates with said recess.

18. An electric motor according to claim 17, wherein if an attempt is made to place said terminal plug in an unacceptable position, one of said projections engages the other of said terminal board and said terminal plug so as to prevent said terminal plug from being positioned in the unacceptable position.

19. An electric motor according to claim 14, wherein said terminal board and said terminal plug include respective indicators such that in said first position and said second position said indicators align themselves to each other.

20. An electric motor according to claim 19, wherein said terminal board indicator includes two arrows positioned on said terminal board and said terminal plug indicator includes one arrow positioned on said terminal plug such that in said first position and said second position, said arrow on said terminal plug points to one of said two arrows on said terminal board.

21. An electric motor according to claim 20, wherein said terminal board indicator further includes low voltage markings and high voltage markings, said markings being located on said terminal board such that in said first position, said indicators indicate that the motor is set for the low voltage power supply and, in said second position, said indicators indicate the motor is set for the high voltage power supply.

22. An electric motor comprising:
- a housing having an axis;
- an end frame mounted on said housing;
- a stator fixed relative to said end frame;
- a shaft rotatable about the axis;
- a rotor supported by said shaft for rotation therewith relative to said stator;
- a pair of windings electrically connectable to a power supply;
- a terminal board which is fixed relative to said end frame and which has at least three in-line terminal board electrical contacts, one of said at least three terminal board electrical contacts being a common terminal board electrical contact, said terminal board including an indicator which includes low voltage markings and high voltage markings, each marking positioned on one side of a dividing line, said dividing line positioned on said terminal board;
- a terminal plug which has an indicator, said terminal plug further including at least two terminal plug electrical contacts engageable with said terminal board electrical contacts such that said terminal plug is electrically connectable to said terminal board in a number of predetermined acceptable positions which include at least first and second positions, such that when said terminal plug is connected to said terminal board in said first position, a first terminal plug electrical contact of said at least two terminal plug electrical contacts is electrically connected to one of said terminal board electrical contacts and a second terminal plug electrical contact of said at least two terminal plug electrical contacts is electrically connected to said common terminal board electrical contact and, said windings are in parallel for creating a low voltage power supply, and such that when said terminal plug is connected to said terminal board in said second position, said first terminal plug electrical contact is electrically connected to said common terminal board electrical contact and, said windings are in series for creating a high voltage power supply, said markings being located on said terminal board such that in said first position, said indicators indicate that the motor is set for low voltage and, in said second position, said indicators indicate the motor is set for high voltage;

a projection on one of said terminal board and said terminal plug; and a recess on the other of said terminal board and said terminal plug, such that when said terminal plug electrically connects to said terminal board in any of said predetermined number of acceptable positions, said projection mates with said recess, and such that said terminal plug is not positionable in an unacceptable position in which one terminal plug electrical contact would engage one terminal board electrical contact and in which said terminal plug would be positionable, because in any position other than said acceptable positions, said projection and said recess cause an interference between said terminal plug and said terminal board.

23. An electric motor according to claim 22, wherein said electrical contacts are either male or female electrical contacts.

* * * * *

UNITED STATES PATENT AND TRADEMARK OFFICE
CERTIFICATE OF CORRECTION

PATENT NO. : 6,040,646
DATED : March 21, 2000
INVENTOR(S) : Richard E. Peters

It is certified that error appears in the above-identified patent and that said Letters Patent is hereby corrected as shown below:

Column 9, claim 6,
Line 38, delete "attrmpt" and insert -- attempt --; and
Line 40, delete "prvent" and insert -- prevent --.

Column 11, claim 14,
Line 6, delete "or" and insert -- for --; and
Line 44, after the first occurrence of "electrical" insert -- contact --.

Signed and Sealed this

Fifth Day of March, 2002

Attest:

JAMES E. ROGAN
*Attesting Officer*   *Director of the United States Patent and Trademark Office*